United States Patent [19]

Underwood

[11] Patent Number: 5,045,025

[45] Date of Patent: Sep. 3, 1991

[54] CO-ROTATIONAL AXIAL FLOW COMBINE

[75] Inventor: Mark R. Underwood, Burr Oak, Kans.

[73] Assignee: Probe Adventures, Inc., Haslet, Tex.

[21] Appl. No.: 570,213

[22] Filed: Aug. 21, 1990

[51] Int. Cl.⁵ .................... A01F 7/06; A01F 12/18; A01F 12/20

[52] U.S. Cl. ........................ 460/66; 460/67; 460/68; 460/70; 460/72; 460/113

[58] Field of Search ............ 460/63, 66-73, 460/113, 119, 8, 14; 56/14.6

[56] References Cited

U.S. PATENT DOCUMENTS

| | | | |
|---|---|---|---|
| 3,828,793 | 8/1974 | Gochanour | 460/70 |
| 4,078,571 | 3/1978 | Todd et al. | 460/66 |
| 4,178,943 | 12/1979 | West | 460/80 |
| 4,236,530 | 12/1980 | Johnson | 460/65 |
| 4,489,733 | 12/1984 | Underwood | 460/8 |
| 4,535,787 | 8/1985 | Underwood | 460/8 |
| 4,986,794 | 1/1991 | Ricketts | 460/67 |

OTHER PUBLICATIONS

A page from a brochure from case International.

Primary Examiner—Stephen J. Novosad
Attorney, Agent, or Firm—James E. Bradley

[57] ABSTRACT

A combine for cutting and threshing grain has an axial flow threshing drum. A feeder head mounts to the forward end of the threshing drum. Impellers on the feeder head push grain into the threshing drum housing and also provide threshing. Rasp bars on the feeder head thresh the crop prior to reaching the threshing drum while pushing the crop through perforations in the feeder housing. The feeder housing and threshing drum housing rotate, but at a slower speed than the threshing drum. A brake will prevent the threshing drum housing from rotating at an excessive speed. Clearances between the threshing drum and threshing drum housing, and clearances between the feeder head rasp bars and feeder housing, ca be adjusted for different crop conditions.

37 Claims, 5 Drawing Sheets

CO-ROTATIONAL AXIAL FLOW COMBINE

BACKGROUND OF THE INVENTION

1. Field of the Invention

This invention relates in general to agricultural equipment and in particular to a combine for harvesting and threshing grain using an axial flow threshing and separating means.

2. Description of the Prior Art

U.S. Pat. No. 4,535,787, Aug. 20, 1985, and U.S. Pat. No. 4,489,733, Dec. 25, 1984, show an axial flow combine. The combine has a feeder head with impellers. The feeder head connects to a conical threshing drum. The threshing drum locates forward of a beater. A feeder housing surrounds the feeder head. The feeder housing connects to a threshing housing, which includes a conical grate and a beater housing.

The impellers force the crop into the clearance between the threshing drum and grate, where most of the threshing will occur. A helical flight forces the crop from the threshing drum between the beater and the beater housing. Final separation of grain from crop will occur in the beater housing. The grain will pass through apertures in the beater housing and in the grate into a sieve. The sieve separates and discharges chaff, passing the clean grain into conveying means to transport it to a grain bin.

While this design is workable, it would be desirable to provide more threshing at an earlier stage in the threshing process. This would allow the length of the threshing drum and beater assembly to be shortened.

In the '787 patent the grate and beater housing rotate, but at a much lower speed than the threshing drum and beater. A possibility exists that the crop may become too packed between the threshing drum and the grate or between the beater and beater housing. If this occurred, a possibility exists that the grate and beater housing would start to rotate in unison with the threshing drum and beater. The bearings and supports are not adequate to handle such high speed rotation of the grate and beater housing.

SUMMARY OF THE INVENTION

In this invention, the feeder head is fitted with rasp bars. The feeder housing is perforated. This causes some threshing to occur in the feeder head prior to reaching the threshing drum. The threshed grain will fall from the perforated feeder housing into the sieves. Air discharged by the impellers will flow through distribution chutes to discharge chaff, but allow grain to pass into the sieves.

A mounting means for the rasp bars for the impeller will cause the rasp bars to move radially outward and inward relative to the axle of the combine. This inward and outward movement occurs when the threshing drum is moved axially. The threshing drum will be moved axially when adjusting the clearance between the threshing drum and the grate for different crop sizes.

The beater housing has perforated plates located in its sidewall and spaced apart from each other. The plates are flat and contain apertures for the grain separated in the beater housing to pass. The plates extend the length of the beater housing and can be removed by sliding them longitudinally. This allows the plates to be replaced with plates having different numbers or sizes of apertures for different grain conditions.

The axial movement of the threshing drum occurs as a result of a threaded screw within a socket mounted between the face of the feeder head and the threshing drum. A hole in the face of the feeder head allows a tool to be inserted to rotate the screw. The feeder head does not move along the axle. Rotation of the screw causes the threshing drum to move along the axle and relative to the feeder head.

A centrifugal brake slows the speed of the rotation of the beater housing if the speed exceeds a set level. The brake assembly includes brake pads mounted to a rotor that rotates with the beater housing. Springs will allow the brake pads to spring outward if the centrifugal force is sufficient. The brake pads will engage a brake drum. The brake drum mounts to a stationary portion of the frame of the combine.

DETAILED DESCRIPTION OF THE INVENTION

Figure 1:
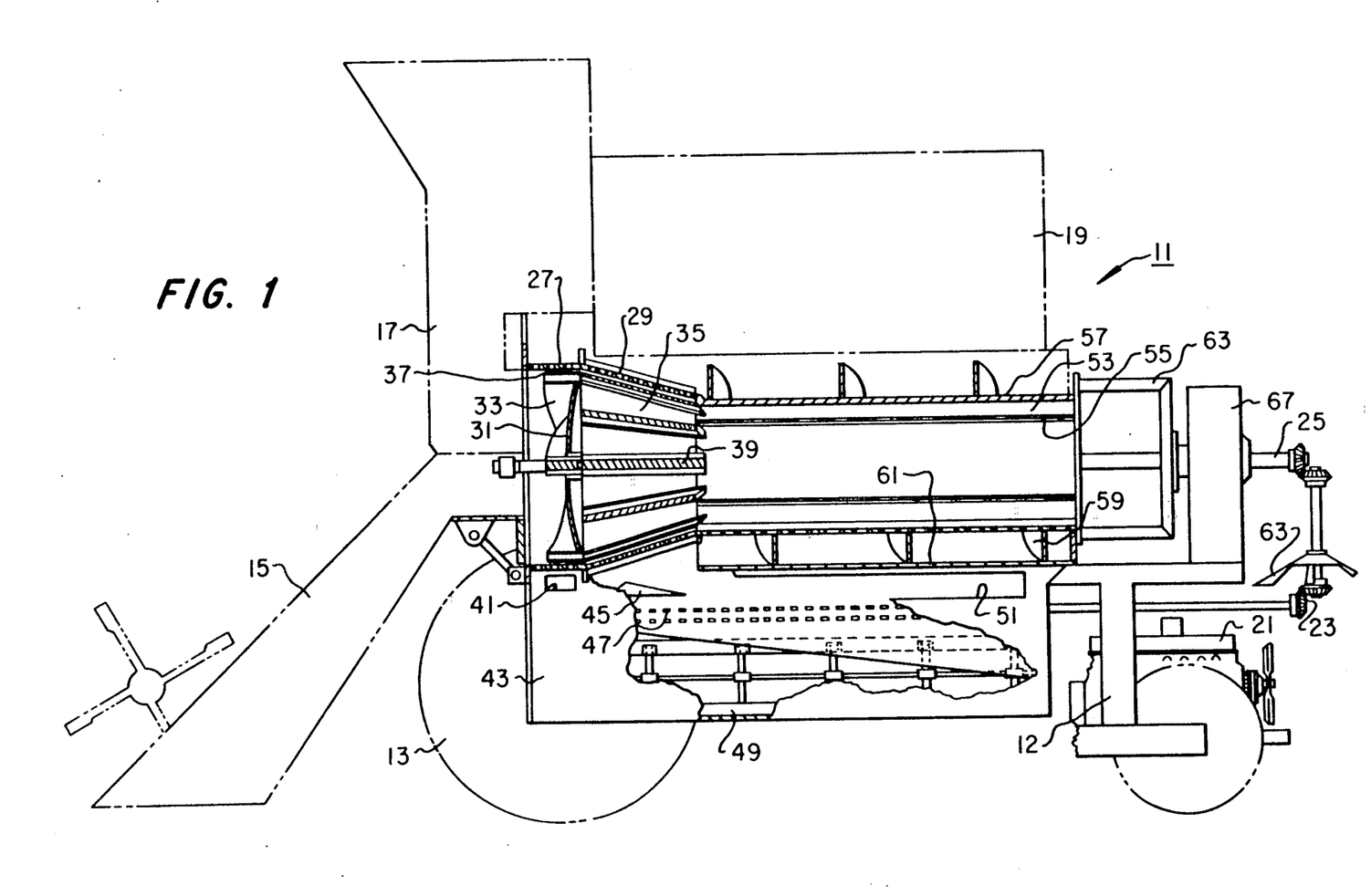
FIG. 1 is a simplified view illustrating a combine constructed in accordance with this invention.

Referring to FIG. 1, combine 11 has a frame 12 mounted on wheels 13. A header 15 located on the forward end of combine 11 will sever the crop and transmit it upward into the combine 11. The operator controls the combine 11 from a control cab 17. The threshed and cleaned grain will be stored in a grain bin 19.

An engine 21 provides the power to move the combine 11. Engine 21 also operates the threshing components of combine 11. Gears 23 transmit torque from engine 21 to a longitudinal axle 25. Axle 25 is parallel to the direction of forward movement of the combine 11.

The header 15 passes the crop into a feeder housing 27. Feeder housing 27 is rotatably driven and perforated. Feeder housing 27 is cylindrical and coaxial with axle 25. Feeder housing 27 connects to and rotates with a conical threshing grate 29.

A feeder head 31 rotates within the feeder housing 27. Feeder head 31 has a plurality of curved impellers 33 on its forward end. Impellers 33 will force the crop rearward in the clearance between the feeder head 31 and feeder housing 27. Feeder head 31 rotates in the same direction as the feeder housing 27, but at a much higher speed, preferably about ten times the rate. Feeder head 31 mounts forward of a conical threshing drum 35 and rotates in unison with threshing drum 35.

Rasp bars 37 locate on the periphery of feeder head 31, closely spaced to the sidewall of feeder housing 27. Rasp bars 37 are parallel to the axle 25. Rasp bars 37 thresh grain in the feeder housing 27. Rasp bars 39 locate on the periphery of threshing drum 35. Rasp bars 39 are straight and define a conical shape for the threshing drum 35, with the smaller diameter at the rearward end. Rasp bars 39 are closely spaced to the grate 29 to thresh grain from the crop and force it out the perforated grate 29.

The rotation of impellers 33 causes air to discharge at a high rate. This air flow will discharge out a window 41 located on each side of combine 11. Each window 41 is located in the forward end of a sieve housing 43. Chaff will also discharge from windows 41.

Grain threshed in the feeder housing 27 and grate 29 will pass onto a rotary distributor 45. Distributor 45 distributes the grain on a pair of primary and secondary sieves 47. Sieves 47 further separate chaff from the grain. A blower 49 located below sieves 47 discharges air upward and out windows 51 on each side. Chaff will also discharge out the windows 51.

A beater 53 mounts to axle 25 directly behind threshing drum 35. Beater 53 rotates with threshing drum 35. Beater 53 has a plurality of longitudinal vanes 55 along its periphery.

A cylindrical beater housing 57 receives the beater 53. Beater housing 57 rotates with the grate 29 and feeder housing 27. An exterior helical flight 59 is rigidly attached to the exterior of the beater housing 57. The beater housing 57 is perforated. The beater 53 will make a final separation of grain from crop in the beater housing 57 and force the grain out the perforations onto a conveyor pan 61. The helical flight 59 forces the rescued grain from the beater housing 57 forward into the forward end of the sieves 47.

The grain cleaned by sieves 47 will transmit along the bottom of sieve housing 43 to a conveyor (not shown). The conveyor will convey the grain to the grain bin 19. The conveyor may be of a type shown in U.S. Pat. Nos. 4,535,787 and 4,489,733. The crop, less the threshed grain, will be pushed out the back of the beater housing 57 onto the ground. A straw spreader 63 will spread the crop as it discharges out the rearward end. Means (not shown) will guide the crop from the rearward end of the beater housing 57 to the straw spreader 63.

The beater housing 57 includes a framework 65 extending out the rearward end of beater housing 57. Framework 65 rotates in unison with beater housing 57. A brake 67 cooperates with framework 65 and the combine frame 12 to serve as an emergency brake. Brake 67 will slow the speed of rotation of the beater housing 57 if it exceeds a set level. More details of the components of combine 11 are shown in the remaining figures.

Figure 2:
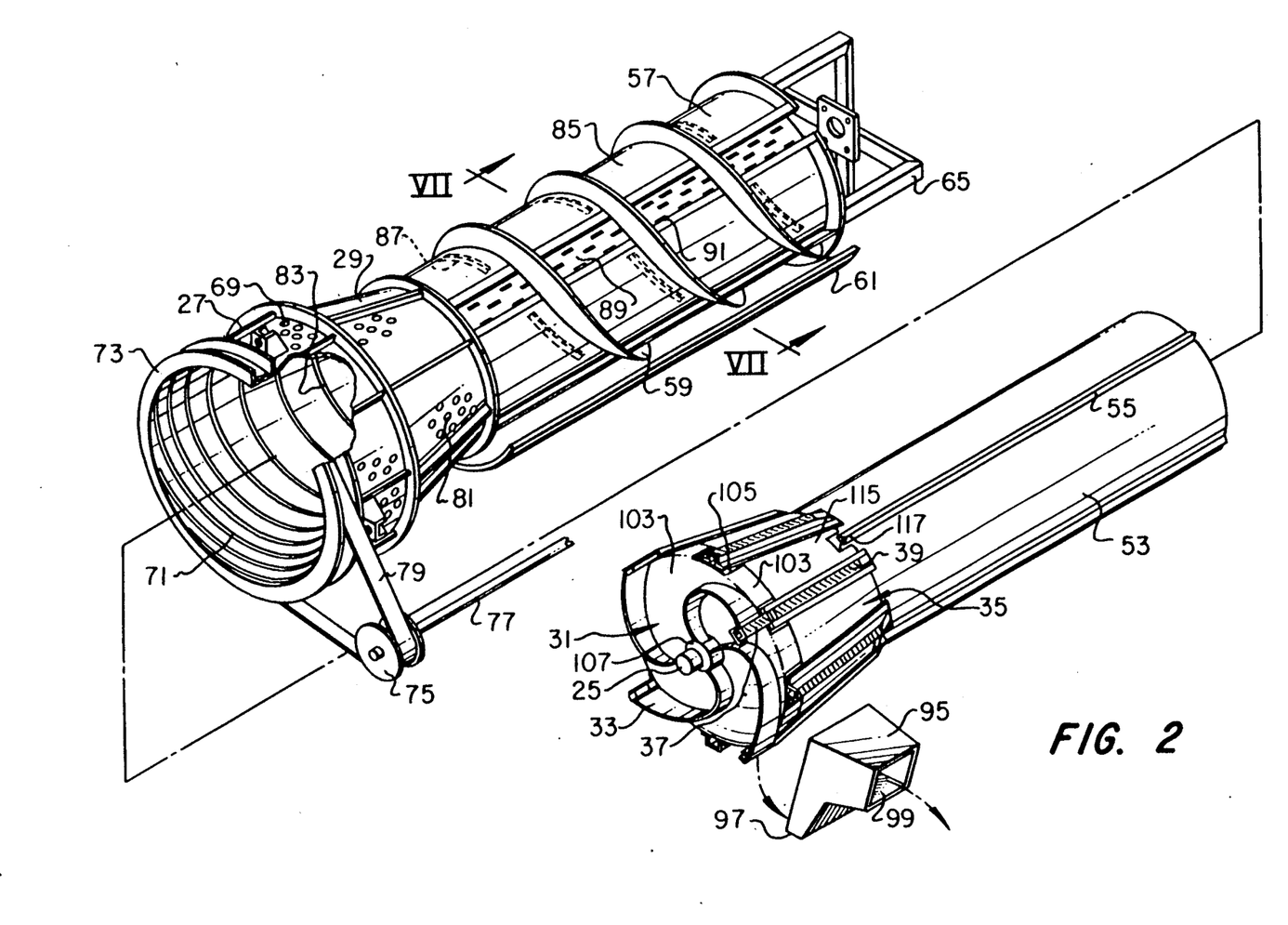
FIG. 2 is a simplified, perspective and exploded view of the threshing housing assembly and the threshing drum assembly for the combine in FIG. 1.

FIG. 2 shows the feeder housing 27 connected to the grate 29, which in turn connects to the forward end of the beater housing 57. Apertures 69 in the feeder housing 27 allow the passage of grain that threshes in the feeder housing 27. The grain will fall directly into the forward end of the sieves 47 (FIG. 1). At least one helical vane 71 locates in the interior of feeder housing 27. Vane 71 is a rib that spirals around at a selected pitch, for directing crop rearward.

A drive rim 73 locates on the forward end of the feeder housing 27. A pulley 75 will be located adjacent drive rim 73. Drive shaft 77 rotates pulley 75. A V-belt 79 connects pulley 75 with drive rim 73. The engine 21 (FIG. 1) rotates the drive shaft 77. This rotation rotates the feeder housing 27, grate 29 and beater housing 57 in unison. Gears (not shown) will result in a rotational speed of less than 100 rotations per minute.

Referring still to FIG. 2, apertures 81 located in grate 29 allow the passage of grain threshed in the grate 29. This grain falls onto the distributor 45 (FIG. 1). A helical vane 83 locates in the interior of grate 29. Vane 83 is preferably a continuation of one of the vanes 71. Vane 83, however, has a pitch that is about twice as much as the pitch of the vanes 71. The distance between each curved section, measured along the axis, will be about double that of the same distance of the vane 71.

Figure 7:
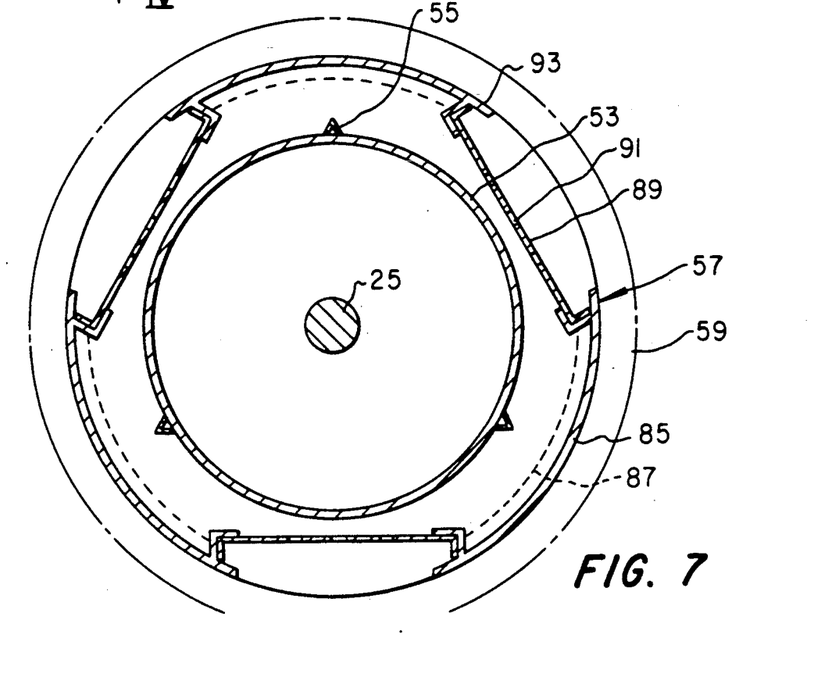
FIG. 7 is partial sectional view of the beater and beater housing, taken along the line VII—VII of FIG. 2 and showing the external flight around the beater housing removed.

Grate 29 is conical, having a smaller diameter rearward end than forward end. The rearward end joins the forward end of the beater housing 57. Beater housing 57 has a plurality of cylindrical sidewall portions 85. The sidewall portions 85 comprise a series of metal curved plates, assembled into a cylindrical shape with longitudinal spaces located between them. The cylindrical sidewall portions 85 are spaced apart from each other, as shown also in FIG. 7, and are solid. Internal vanes 87, shown by dotted lines, locate on the interior of the cylindrical sidewall portions 85. The vanes 87 are curved, and are not continuous with each other. Vanes 87 are spaced axially to push the crop in a rearward direction.

The longitudinal spaces between the sidewall portions 85 contain flat perforated plates 89. Plates 89, as shown also in FIG. 7, have perforations 91. The perforations 91 allow grain separated in the beater housing 57 to fall onto the conveyor pan 61. The plates 89 will slide longitudinally within flanges 93 formed on the edges of each of the sidewall portions 85. The plates 89 extend the full length of the beater housing 57. They can be withdrawn and replaced with plates 89 having different sizes or numbers of perforations 91. This is handled by sliding the plates 89 inward and outward along the flanges 93.

Referring still to FIG. 2, a duct 95 is schematically shown adjacent the feeder head impellers 33. Duct 95 mounts to the side of the sieve housing 43, registering with the window 41, shown in FIG. 1. Duct 95 has an entry portion 97 that extends upward and outward. The entry portion 97 increases in cross sectional dimension as it proceeds upward. At the upper end, entry section 97 extends downward to a discharge 99.

Air blown by impellers 33, indicated by the arrow, enters the entry section 97, flows up the duct 95, then downward and out the discharge 99. Because of the upward and downward direction, as well as the increase in flow area as the entry section 97 proceeds upward, grain will not flow out the duct 95. The air velocity slows in the larger flow area, causing the grain to drop downward back into the sieve housing 43 (FIG. 1).

Figure 3:
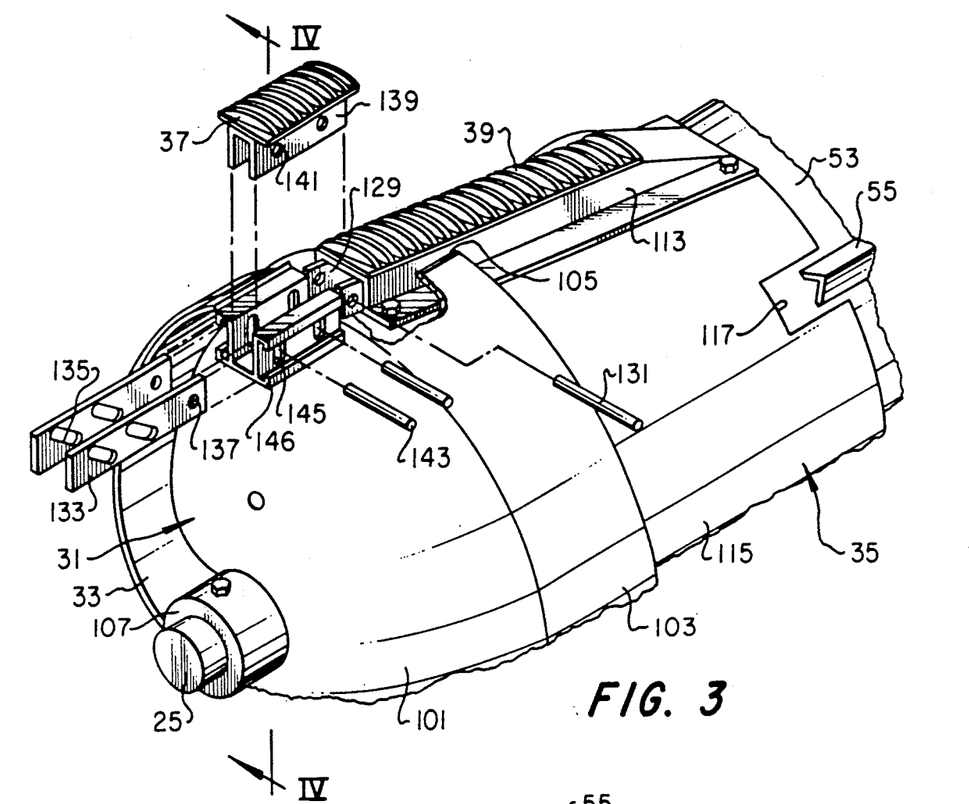
FIG. 3 is a partial perspective view illustrating a portion of the threshing drum assembly of FIG. 2.

Referring now to FIG. 3, the feeder head 31 has a forward face 101. The forward face 101 is convex and protrudes in a forward direction. Impellers 33 are welded to the forward face 101. Feeder head 31 also has a generally cylindrical lip 103 at its periphery. Lip 103 extends rearward from the face 101. Recesses 105 formed in the lip 103 will accommodate the forward ends of the feeder threshing drum rasp bars 39. When the threshing drum 35 is in a forward position relative to the feeder head 31, the forward ends of the rasp bars 39 will locate within the recesses 105 in the lip 103.

Figure 4:
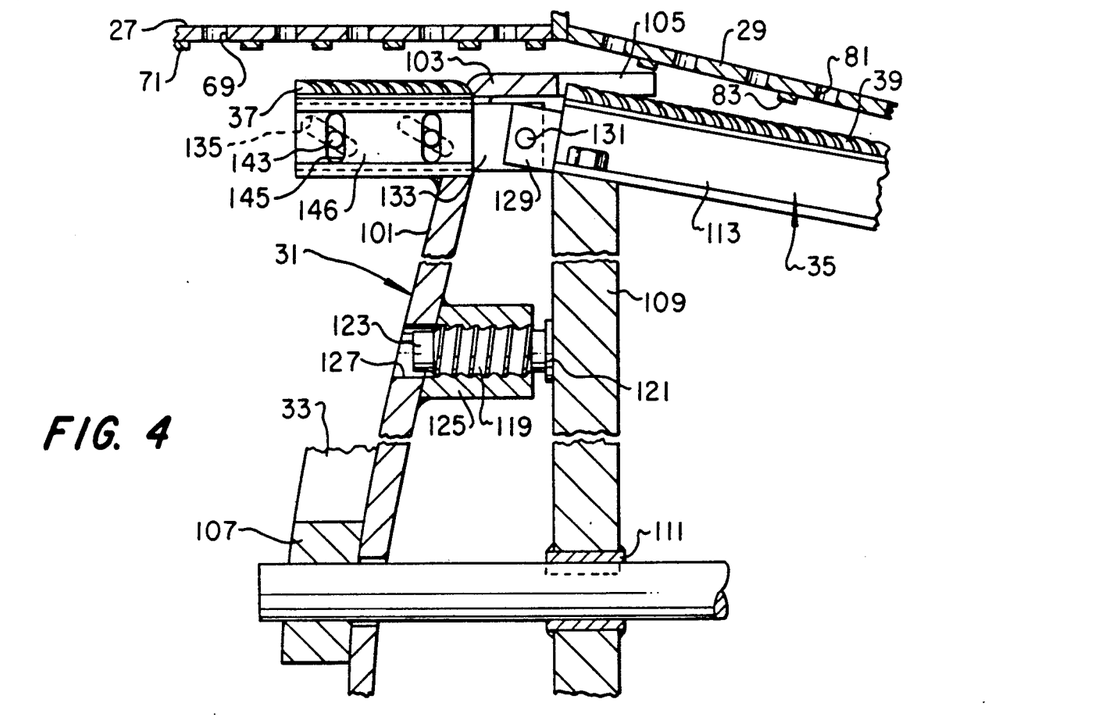
FIG. 4 is a partial, sectional view of the threshing drum assembly of FIG. 3, taken along the line IV—IV of FIG. 3, and showing the threshing drum in a forward position relative to the threshing grate.

Referring also to FIG. 4, a collar 107 will secure the feeder head 31 to the axle 25. Collar 107 secures to the axles 25 by screws and will not allow any movement of feeder head 31 along the axle 25. Collar 107 also has keys (not shown) for causing the feeder head 31 to rotate in unison with axle 25.

Figure 5:
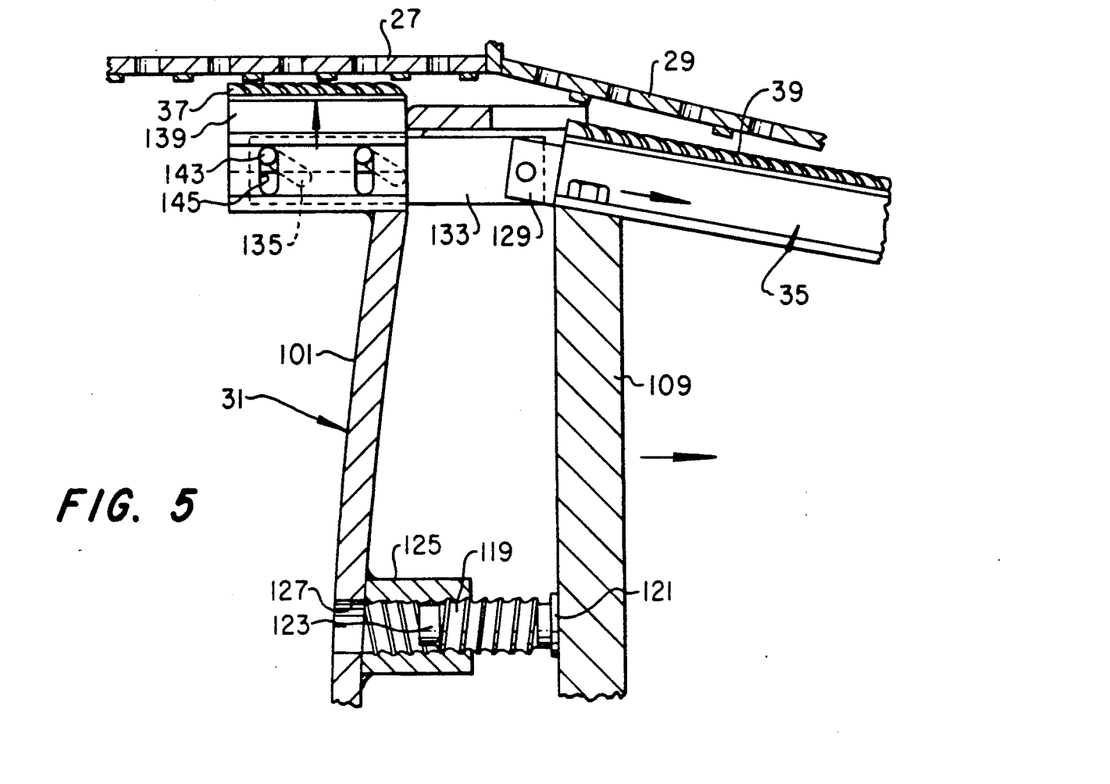
FIG. 5 is a partial sectional view of a portion of the threshing drum assembly as shown in FIG. 4, but showing the threshing drum in a rearward position relative to the threshing grate. The impellers on the feeder head are not shown.

Referring particularly to FIGS. 4 and 5, the threshing drum 35 includes a drum plate 109. Plate 109 is a circular flat plate mounted perpendicular to axle 25. Plate 109 mounts to axle 25 by means of a collar 111. A key (not shown) will engage collar 111 with axle 25 so that rotation of axle 25 rotates the drum plate 109. The collar 111 allows the drum plate 109 to slide axially on the axle 25. Rasp bar supports 113 will bolt between drum plate 109 and a similar plate (not shown) located on the rearward end of threshing drum 35. The bar supports 113 support the threshing drum rasp bars 39.

Referring again to FIG. 3, curved wall plates 115 will locate between each of the rasp bar supports 113. The curved wall plates 115 define the conical contour of the threshing drum 35. Recesses 117 locate on the rearward end of the wall plates 115. The recesses 117 will receive the forward ends of the beater exterior vanes 55. The beater 53 does not move longitudinally relative to the axle 25. The recesses 117 will accommodate the forward ends of the beater vanes 55 when the threshing drum 35 moves rearward relative to the beater 53. The wall plates 115 will slide over a small portion of the forward end of the beater 53 during this rearward movement.

The forward and rearward axial movement of the threshing drum 35 relative to the feeder head 31, feeder housing 27, and grate 29 is illustrated by comparing FIGS. 4 and 5. A plurality of screws 119 (only one shown) each have one end rotatably mounted in a retainer 121 which is secured to drum plate 109. Retainer 121 allows rotation of screw 119 relative to the drum plate 109, but retains screw 119 with drum plate 109. Screw 119 has a polygonal head 123 for receiving a tool to rotate screw 119. Screw 119 is carried in an internally threaded socket 125. Socket 125 is welded to the interior of the feeder head face 101. A hole 127 in the feeder head face 101 allows a tool to access the screw head 123. Rotating the screw 119 in one direction will cause the plate 109 to move rearward, shown by FIG. 5. Rotating the screw 119 in the opposite direction will draw the drum plate 109 forward.

When the plate 109 moves rearward, it will move further into the conical grate 29. When this occurs, the clearance between the rasp bars 39 and the grate 29 decreases. An operator will move the threshing drum 39 axially to change this clearance for different crop conditions.

The feeder head rasp bars 37 must close the clearance between the rasp bars 37 and the feeder head 31 in proportion to the closing of the clearance between the threshing drum rasp bars 39 with the grate 29. This is handled as illustrated in FIGS. 3-5. The mounting means for the feeder head rasp bars 37 will simultaneously move the rasp bars 37 radially inward and outward relative to the axle 25 when the threshing drum 35 moves axially.

A flange 129 rigidly attaches to the forward end of the bar supports 113. Flange 129 connects by a pin 131 to a Cam plate 133. Cam plate 133 has a pair of inclined slots 135. Pin holes 137 receive the pins 131 to connect the cam plate 133 with the flange 129.

A bracket, comprising two spaced apart radial plates 139, supports the rasp bar 37. A pair of holes 141 in the bracket plates 139 rigidly receive a pair of pins 143. Pins 143 extend through the inclined slots 135 in the cam plate 133. Pins 143 also extend through a pair of radial slots 145 formed in a brace 146. Brace 146 comprises a pair of spaced apart plates that will slidably receive the cam plate 133 and the bracket plates 139. Brace plates 146 are welded to the feeder head face 101.

The bracket plates 139 will slide radially relative to the brace plates 146. The radial slots 145 will prevent any movement of the bracket plates 139, other than in radial directions. The cam plates 133 will slide axially relative to the bracket plates 139 and brace plates 146. The inclined slots 135 will translate axial movement of cam plates 133 into radial movement of bracket plates 139. This occurs as the cam plate 133 pushes the pins 143 between the upper forward ends of the slots 135 and the lower rearward ends of the slots 135. The sliding movement of the cam plate 133 is caused by the movement of the flanges 129 with the threshing drum 35.

Figure 6:
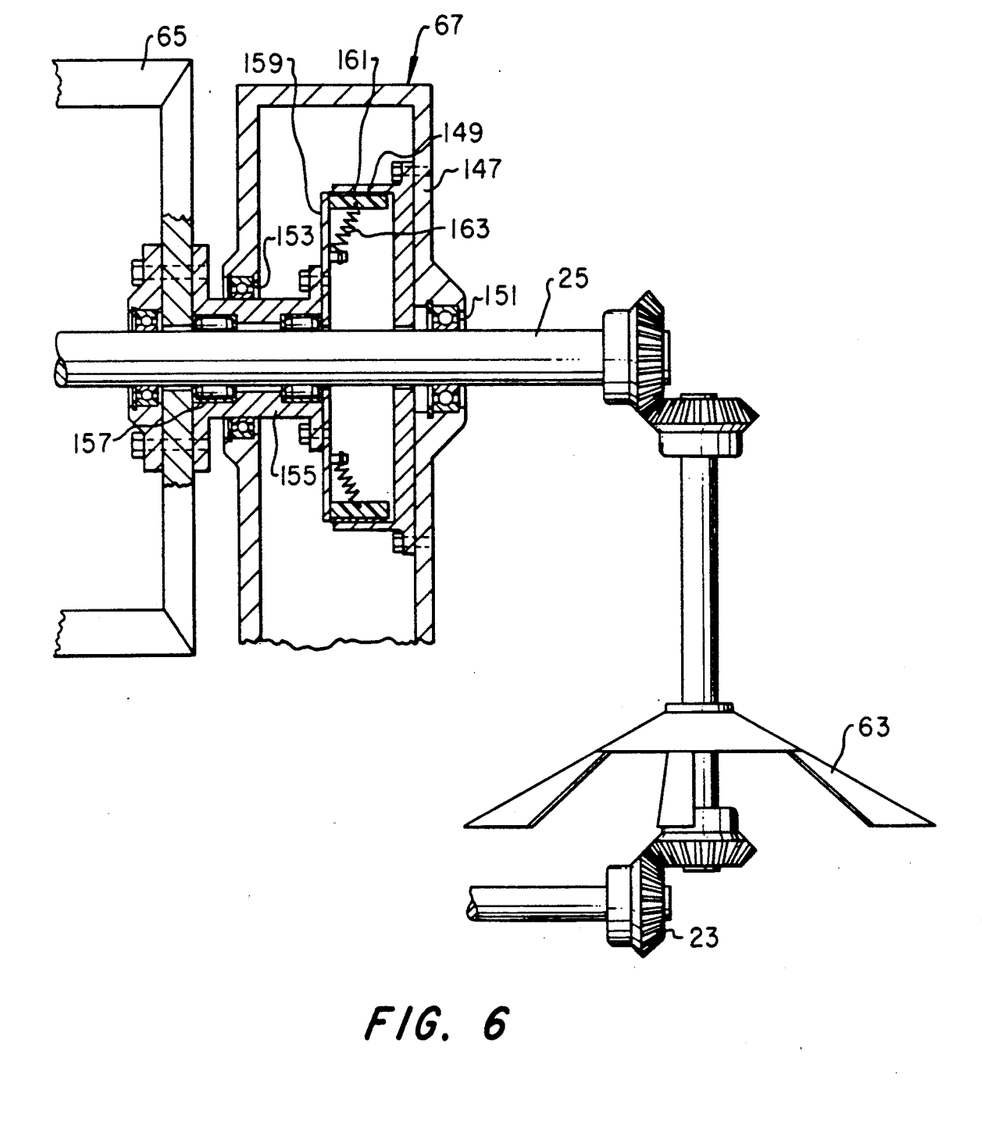
FIG. 6 is a partial sectional view of a brake assembly for the combine in FIG. 1.

FIG. 6 illustrates details of the brake 67. A brake housing 147 extends downward and stationarily mounts to the combine frame 12, as shown in FIG. 1. A brake drum 149 mounts rigidly to an inner sidewall of brake housing 147. Brake drum 149 will thus be stationary with the frame 12 (FIG 1). Bearings 151 located on the rearward end of brake housing 147 allow the axle 25 to pass rotatably through the brake housing 147.

Bearings 153 are located on the forward end of brake housing 147. Bearings 153 rotatably support the forward end of housing 147 on a bearing housing 155. Bearing housing 155 is a cylindrical member that mounts rigidly to the beater housing framework 65. This allows the beater housing 57 (FIG. 1) to rotate relative to the bearing housing 155. The bearing housing 155 supports bearings 157, which in turn support the beater housing framework 65 on the axle 25.

A rotor 159 mounts to the rearward end of the bearing housing 155. Rotor 159 will thus rotate in unison with the beater housing framework 65. A plurality of brake pads 161 are carried on the rearward side of rotor 159. Brake pads 161 locate within the brake drum 149. Brake pads 161 will move radially outward from axle 25 due to centrifugal force. Springs 163 act in an opposite direction to the centrifugal force to prevent this radial outward movement unless the centrifugal force reaches a high enough level to overcome the force of springs 163. In that event, the brake pads 161 will frictionally engage the drum 149. The frictional engagement will greatly slow down the rotational speed of the beater housing 57 (FIG. 1).

In operation, referring to FIG. 1, the operator will adjust the clearances between the threshing drum 35 and the grate 29 for the particular crop. He will do this by inserting a tool in each hole 127 to engage each screw 119, as illustrated in FIG. 4. He rotates the screws 119 to move the threshing drug 35 forward or rearward relative to the grate 29. During this movement, the feeder head rasp bars 37 will move radially inward or outward to vary the clearance between the feeder head rasp bars 37 and the feeder housing 27. The operator will also decide if he needs to replace the perforated beater housing plates 89 (FIG. 2) with plates 89 having different sizes of perforations 91. If so, he slides them rearwardly out from the beater housing 57 and replaces them.

Once adjusted, the operator will begin cutting grain. The feeder head 31, threshing drum 35, and beater 53 will rotate in unison at a fairly high speed, up to about 1000 rpm. The feeder housing 27, grate 29, and beater housing 57 will rotate in unison also. This rotation will be in the same direction, but at a much lower speed, such as 100 rpm. The header 15 forces the crop into the feeder housing 27. Impellers 33 will move the crop rearward and outward. Considerable threshing will occur in the feeder housing 27 due to the feeder head rasp bars 37 rotating in close proximity to the helical vane 71 (FIG. 2). The threshed grain will pass out the aperture 69 (FIG. 2) into the sieve housing 43 (FIG. 1). Chaff and air discharge from impellers 33 will discharge out the windows 41.

Additional threshing will occur in the grate 29, with grain passing on to the sieves 47. The crop moves into the beater housing 57 for final separation. The vanes 55 of beater 53 cause a final separation of the crop. The rescued grain passes through the perforated plates 89 (FIG. 2) onto the conveyor pan 61. Helical flight 59 pushes the rescued grain toward and onto the sieves 47. The sieves 47 discharge chaff out the windows 51. Clean grain will be conveyed to the storage bin 19.

The invention has significant advantages. The perforated feeder housing and rasp bars provide threshing before reaching the threshing drum. This allows the entire threshing assembly to be shortened. This also increases the capacity of the threshing assembly. The flat perforated plates of the beater housing allow quick changes to be made for different threshing conditions. The automatic radial movement of the feeder head rasp bars provide for quick clearance adjustments of the feeder head while the threshing drum is being adjusted. The brake provides a safety against excessive rotational speed of the feeder housing, grate and beater housing.

While the invention has been shown in only one of its forms, it should be apparent to those skilled in the art that it is not so limited, but is susceptible to various changes without departing from the scope of the invention.

I claim:

1. In a combine having a frame mounted on wheels and having a longitudinal axis, a header for cutting crop, a rotatably driven threshing drum mounted along the longitudinal axis inside a hollow grate containing apertures for threshed grain to fall into a sieve for separating chaff from the grain, a feeder head on the forward end of the threshing drum and having a set of curved impellers carried on the forward face of the feeder head inside a feeder housing, the feeder housing being mounted to the forward end of the grate for receiving the crop from the header, the improvement comprising in combination:
    a plurality of apertures in the feeder housing for allowing any grain threshed by the impellers to pass downward out of the feeder housing without moving into the grate; and
    the sieve being mounted to the frame for receiving the grain that passes through the apertures in the feeder housing.

2. The combine according to claim 1 further comprising:
    chaff discharge means mounted below the feeder housing at the forward end of the sieve for discharging air blown by the rotation of the impellers laterally outward, and along with the air, chaff separated from the grain passing through the apertures of the feeder housing.

3. The combine according to claim 1 wherein the feeder housing has an inside wall and wherein the improvement further comprises:
    at least one helically extending vane located on the inside wall of the feeder housing.

4. The combine according to claim 1 further comprising a plurality of rasp bars mounted to the periphery of the feeder head.

5. The combine according to claim 1 further comprising:
    means for preventing any axial movement of the feeder head along the longitudinal axis; and
    means for moving the threshing drum along the longitudinal axis relative to the grate, feeder housing and feeder head for adjustment.

6. The combine according to claim 1 wherein the feeder housing has an inside wall, the improvement further comprising:
    a plurality of rasp bars mounted to the periphery of the feeder head;
    means for moving the threshing drum along the longitudinal axis relative to the grate and feeder housing for adjustment; and
    means for selectively moving the rasp bars closer to and farther from the inside wall of the feeder housing for adjustment.

7. In a combine having a frame mounted on wheels and having a longitudinal axis, a header for cutting crop, a rotatably driven conical threshing drum mounted along the longitudinal axis inside a conical hollow grate, defining a clearance, the grate containing apertures for threshed grain to fall, a feeder head on the forward end of the threshing drum and having a set of curved impellers carried on the forward face of the feeder head inside a feeder housing, the feeder housing being mounted to the forward end of the grate and having a cylindrical side wall for receiving the crop from the header, the improvement comprising in combination:
    a plurality of rasp bars mounted to the periphery of the feeder head and closely spaced from the side wall of the feeder housing, defining a clearance for threshing grain in the feeder housing;
    a plurality of apertures in the side wall of the feeder housing for allowing grain threshed by the impellers and rasp bars to pass downward out of the feeder housing without moving into the grate;
    axial adjusting means for moving the threshing drum along the axis relative to the grate and to the feeder housing, varying the clearance between the threshing drum and the grate; and
    mounting means for mounting the rasp bars to the feeder head so that the rasp bars will selectively move radially inward and outward relative to the longitudinal axis, to the vary the clearance between the rasp bars and the side wall of the feeder housing.

8. The combine according to claim 7 further comprising:
    chaff discharge means mounted directly below the feeder housing for discharging air blown by the rotation of the impellers laterally outward, and along with the air, chaff separated from the grain passing through the apertures of the feeder housing.

9. The combine according to claim 8 wherein the chaff discharge means comprises a chute mounted on each side of the combine below the impellers, the chute extending upward and outward to direct chaff and air outward but prevent grain from blowing outward.

10. The combine according to claim 7 wherein the mounting means moves the rasp bars radially automatically in response to axial movement of the threshing drum.

11. The combine according to claim 7 wherein the axial adjusting means comprises:
a threaded member rotatably mounted in a threaded socket secured between the feeder head and threshing drum, so that rotation of the threaded member in one direction causes the threshing drum to move away from the feeder head, and rotation of the threaded member in the other direction causes the threshing drum to move toward the feeder head.

12. The combine according to claim 7 wherein the mounting means for each rasp bar comprises:
a bracket extending from the rasp bar;
a brace rigidly attached to the feeder head and slidably receiving the bracket;
a sliding plate mounted to the threshing drum for axial movement therewith and slidingly engaging the bracket;
cam slot and follower means cooperating with the bracket, brace and plate, for causing axial movement of the plate to move the bracket and rasp bar radially.

13. The combine according to claim 7 further comprising:
at least one helically extending vane rigidly mounted on the inside of the side wall of the feeder housing.

14. The combine according to claim 7 further comprising:
at least one helically extending vane rigidly mounted on the inside of the side wall of the feeder housing; and
at least one helically extending rigidly mounted on the inside of the grate.

15. The combine according to claim 14 wherein the vane in the feeder housing has a lesser axial pitch than the vane in the grate.

16. In a combine having a frame mounted on wheels, a longitudinal axle and a header for cutting crop, the improvement comprising in combination:
a rotatably driven conical threshing drum mounted on the axle for rotation therewith, the threshing drum being smaller on its rearward end than its forward end;
a conical hollow grate carried by the frame, the threshing drum being located within the grate, defining a clearance, the grate containing apertures for threshed grain to fall;
a feeder housing carried by the frame forward of the grate, the feeder housing having a cylindrical side wall containing a plurality of apertures for grain to pass through;
a feeder head mounted rigidly mounted to the axle on the forward end of the threshing drum and having a forward face containing a set of curved impellers;
a plurality of rasp bars mounted to the periphery of the feeder head and closely spaced from the side wall of the feeder housing, defining a clearance for threshing grain in the feeder housing;
axial adjusting means for moving the threshing drum along the axle relative to the grate, the feeder head and the feeder housing, for varying the clearance between the threshing drum and the grate;
means for causing the rasp bars on the feeder head to move radially inward and outward relative to the axle as the axial adjusting means moves the threshing drum forward and rearward, respectively, to the vary the clearance between the rasp bars and the side wall of the feeder housing; and
chaff discharge means mounted directly below the feeder housing at the forward end of the sieve for discharging air blown by the rotation of the impellers laterally outward, and along with the air, chaff separated from the grain passing through the apertures of the feeder housing.

17. The combine according to claim 16 wherein the chaff discharge means comprises a chute mounted on each side of the combine below the impellers, the chute extending upward and outward to direct chaff and air outward but prevent grain from blowing outward.

18. In a combine having a frame mounted on wheels and having a longitudinal axis, a header for cutting crop, a rotatably driven threshing drum mounted along the longitudinal axis inside a hollow grate, the grate containing apertures for threshed grain to fall, the improvement comprising in combination:
a feeder housing having a side wall;
means for mounting the feeder housing to the frame forward of the grate;
drive means for rotating the feeder housing relative to the rotation of the thrashing drum;
a feeder head on the forward end of the threshing drum and having a forward face;
a set of curved impellers carried on the forward face of the feeder head and located within the feeder housing; and
a plurality of rasp bars mounted to the periphery of the feeder head and closely spaced from the side wall of the feeder housing, defining a clearance for threshing some of the crop in the feeder housing before the crop reaches the grate.

19. The combine according to claim 18 further comprising:
a plurality of apertures in the side wall of the feeder housing for allowing crop threshed by the impellers and rasp bars to pass downward out of the feeder housing without moving into the grate.

20. The combine according to claim 18 further comprising:
mounting means for mounting the rasp bars to the feeder head so that the rasp bars will selectively move radially inward and outward relative to the longitudinal axis, to the vary the clearance between the rasp bars and the side wall of the feeder housing.

21. The combine according to claim 18 wherein the side wall of the feeder housing is cylindrical.

22. The combine according to claim 18 wherein the drive means rotates the feeder housing in the same direction as the rotation of the threshing drum, but at a much lower speed.

23. In a combine having a frame mounted on wheels and having a longitudinal axis, a header for cutting crop, a rotatably driven threshing drum mounted along the longitudinal axis inside a hollow grate, the grate containing apertures for threshed grain to fall, the improvement comprising in combination:
a beater housing extending rearward from the grate;

a beater mounted to the threshing drum for rotation therewith and extending rearward within the beater housing;

a plurality of vanes mounted on the beater and closely spaced to the beater housing for performing final threshing on the crop discharged rearwardly from the grate;

at least one perforated plate; and mounting means for releasably mounting the perforated plate to the beater housing, forming a part of the beater housing and allowing grain separated from the crop in the beater housing to fall through perforations in the perforated plate, the mounting means allowing the perforated plate to be readily removed from the beater housing and replaced with another perforated plate for different crop threshing conditions.

24. The combine according to cl..aim 23 wherein the perforated plate is flat.

25. The combine according to claim 23 wherein the perforated plate extends the length of the beater housing.

26. The combine according to claim 23 wherein the mounting means allows installation and removal of the perforated plate by longitudinally sliding the perforated plate relative to the beater housing.

27. In a combine having a frame mounted on wheels and having a longitudinal axis, a header for cutting crop, a rotatably driven threshing drum mounted along the longitudinal axis inside a hollow grate, the grate containing apertures for threshed grain to fall, the improvement comprising in combination:

a beater housing extending rearward from the grate, the beater housing having a cylindrical side wall;

a beater mounted to the threshing drum for rotation therewith and extending rearward within the beater housing;

a plurality of vanes mounted on the beater and closely spaced to the beater housing for performing final threshing on the crop discharged rearwardly from the grate;

a plurality of flat perforated plates; and mounting means for mounting the perforated plates to the side wall of the beater housing to form a part of the side wall of the beater housing, the perforated plates being spaced apart circumferentially around the side wall of the beater housing and extending longitudinally the full length of the beater housing, the perforated plates allowing grain separated from the crop in the beater housing to fall through perforations in the perforated plates.

28. The combine according to claim 27 wherein the mounting means allows the perforated plates to be readily removed and replaced with other perforated plates for different crop threshing conditions.

29. The combine according to claim 28 wherein the mounting means allows installation and removal of the perforated plate by longitudinally sliding the perforated plate relative to the beater housing.

30. The combine according to claim 27 wherein the grate is rotatably driven and wherein the beater housing rotates in unison with the grate.

31. The combine according to claim 30 wherein the combine has a sieve mounted below the beater housing for separating chaff from grain threshed from the crop, and wherein the improvement further comprises:

a helical flight extending around the circumference of the beater housing for rotation with the beater housing; and conveying means mounted below the helical flight stationary with the frame of the combine for cooperating with the helical flight to convey grain falling through the perforations of the perforated plates forward to a forward end of the sieve.

32. The combine according to claim 31 wherein the conveying means comprises a pan mounted to the frame below the helical flight.

33. In a combine having a frame mounted on wheels and having a longitudinal axis, a header for cutting crop, a rotatably driven longitudinally mounted threshing drum, the improvement comprising in combination:

a threshing housing carried by the frame for receiving the threshing drum;

drive means for rotating the threshing housing in the same direction as but at a lower speed than the threshing drum; and brake means mounted between the threshing housing and the frame for preventing excessive rotational speed of the threshing housing should the threshing housing commence to rotate with the threshing drum because of jamming of crop between the threshing drum and the threshing housing.

34. The combine according to claim 33 wherein the brake means utilizes centrifugal force caused by rotation of the threshing housing to apply braking when the centrifugal force exceeds a selected level.

35. The combine according to claim 33 wherein the brake means comprises:

a brake drum stationarily mounted to the frame;

a plurality of brake pads; and mounting means for mounting the brake pads for rotation with the threshing housing, the mounting means having spring means connected to the brake pads for allowing the brake pads to move radially outward due to centrifugal force into contact with the brake drum if the centrifugal force exceeds the force of the springs.

36. In a combine having a frame mounted on wheels and having a longitudinal axis, a header for cutting crop, a rotatably driven longitudinally mounted conical threshing drum, the improvement comprising in combination:

a conical grate carried by the housing for receiving the threshing drum, the grate having apertures for grain threshed from the crop to pass through;

a beater housing extending rearward from the grate, the beater housing having a cylindrical side wall and having apertures for grain in the beater housing to pass through;

a beater mounted to the threshing drum for rotation therewith and extending rearward within the beater housing;

a plurality of vanes mounted on the beater and closely spaced to the beater housing for performing final threshing on the crop discharged rearwardly from the grate;

drive means for rotating the grate and the beater housing in unison with each other and in the same direction as but at a lower speed than the threshing drum; and brake means mounted between the beater housing and the frame for preventing excessive rotational speed of the grate and beater housing should the grate and beater housing commence to rotate with the threshing drum because of jamming of crop between the threshing drum and the grate and because of jamming of crop between the beater and the beater housing.

37. The combine according to claim 36 wherein the brake means comprises:
   a brake drum stationarily mounted to the frame;
   a plurality of brake pads; and
   mounting means for mounting the brake pads for rotation with beater housing, the mounting means having spring means connected to the brake pads for allowing the brake pads to move radially outward due to centrifugal force into contact with the brake drum if the centrifugal force exceeds the force of the springs.

* * * * *